(12) United States Patent
Wang et al.

(10) Patent No.: US 10,721,800 B1
(45) Date of Patent: Jul. 21, 2020

(54) LED LIGHT PANEL CAPABLE OF ADJUSTING COLOR TEMPERATURE

(71) Applicant: GENERAL LUMINAIRE CO., LTD., Taipei (TW)

(72) Inventors: Yung-Hong Wang, Taipei (TW); Chien Lee, New Taipei (TW); Chuan-Zhu Pan, Shanghai (CN); Qin Zhou, Shanghai (CN)

(*) Notice: Subject to any disclaimer, the term of this patent is extended or adjusted under 35 U.S.C. 154(b) by 0 days.

(21) Appl. No.: 16/351,530

(22) Filed: Mar. 13, 2019

(51) Int. Cl.
| | |
|---|---|
| H05B 45/20 | (2020.01) |
| H05B 45/37 | (2020.01) |
| G06F 9/30 | (2018.01) |
| G06K 19/07 | (2006.01) |

(52) U.S. Cl.
CPC ......... H05B 45/20 (2020.01); G06F 9/30003 (2013.01); G06K 19/0725 (2013.01); H05B 45/37 (2020.01)

(58) Field of Classification Search
None
See application file for complete search history.

(56) References Cited

U.S. PATENT DOCUMENTS

| | | | | |
|---|---|---|---|---|
| 2012/0113633 | A1* | 5/2012 | Bowen | F21V 3/04 362/235 |
| 2012/0319587 | A1* | 12/2012 | Pokrajac | H05B 45/50 315/122 |
| 2019/0110343 | A1* | 4/2019 | Van Kaathoven | H05B 45/10 |

* cited by examiner

*Primary Examiner* — Dedei K Hammond

(57) ABSTRACT

An LED lamp panel capable of adjusting color temperature includes a first LED lighting circuit, a second LED lighting circuit and a conduction control circuit. The first LED lighting circuit has first color temperature information, the second LED lighting circuit has second color temperature information, and both first and second LED lighting circuits are electrically connected to conduction a control circuit. The LED lamp panel is capable of adjusting the color temperature of the LED lamp panel according to the color temperature information of the manufactured LED light panel, so as to adjust the color temperature of a lamp product. This invention is applicable for changes of market requirements flexibly to reduce the lighting manufacturers' pressure and risk of inventory. Consumers can adjust the color temperature of the lamp by themselves to fit different living or working environments.

20 Claims, 8 Drawing Sheets

| 0 | PWM input clock type |
|---|---|
| 1 | 8/16 selection |
| 2 | current CCT |
| 3 | CCT1 |
| 4 | CCT1_CH1_ON_T |
| 5 | CCT1_CH2_ON_T |
| 6 | CCT1_CH3_ON_T |
| 7 | CCT2 |
| 8 | CCT2_CH1_ON_T |
| 9 | CCT2_CH2_ON_T |
| 10 | CCT2_CH3_ON_T |
| ... | ... |
| ... | CCTn |
| ... | CCTn_CH1_ON_T |
| ... | CCTn_CH2_ON_T |
| ... | CCTn_CH3_ON_T |

Fig. 9

LED LIGHT PANEL CAPABLE OF ADJUSTING COLOR TEMPERATURE

FIELD OF INVENTION

The present invention relates to the field of lighting equipment, in particular to a light panel provided for lighting equipment manufacturers to adjust the color temperature of the lamp panel.

BACKGROUND OF INVENTION

Description of the Related Art

Light emitting diode (LED) lamps have been used widely in modern society, and will show different light colors and brightness through different color temperatures and make people feel different. A conventional LED as shown in FIG. 1 includes a constant current driving circuit 101 and an LED light panel 102 electrically coupled to each other. Wherein, the LED light panel 102 has a plurality of LEDs installed on a circuit board and electrically coupled to one another in a serial or parallel connection manner. Therefore, the color temperature of the LEDs installed to an LED light panel is fixed in its operating mode, so that the whole or a part of the LEDs will be conducted or disconnected at the same time.

As to lighting manufacturers, the LED lamps are products purchased for the purpose of resale, so that the color temperature of the LEDs cannot be changed by oneself. If the market requirements of the color temperature have changed, the LED light panel unable to change the color temperature will become a slow-moving product and create a pressure of inventory. Therefore, the conventional LED light panel may cause risks and damages to lighting manufacturers.

In view of the aforementioned issues, the team of the inventor of the present invention based on years of experience in the related industry to conduct extensive research and experiment, and finally developed an LED lamp panel capable of adjusting color temperature to overcome the aforementioned drawbacks of the prior art.

SUMMARY OF THE INVENTION

Therefore, it is a primary objective of the present invention to overcome the drawbacks of the prior art by providing an LED lamp panel capable of adjusting color temperature, and the LED lamp panel allows related lighting manufacturers to adjust the color temperature of the LED light panel by themselves, so as to avoid the pressure of inventory caused by the conventional LED light panel.

To achieve the aforementioned and other objectives, the present invention discloses an LED lamp panel capable of adjusting color temperature, so that after the LED light panel exists a factory, users may input target color temperature information which is provided for a control chip to compute color temperature parameter information and color temperature target information, so as to adjust the color temperature of the LED light panel. Therefore, the users may use the chip to compute the target color temperature information and the matching data table, and generate an execution instruction containing a conduction time ratio, so as to adjust the color temperature of the LED light panel. Particularly for lighting manufacturers, this invention can be adapted flexibly to the change of market requirements to reduce the lighting manufacturers' pressure and risk of inventory. On the other hand, lamp consumers can adjust the color temperature of the lamp to fit different living or working environments.

BRIEF DESCRIPTION OF THE DRAWINGS

FIG. 9 is a table listing the stored information of an interface element or a control chip of the fourth embodiment of the present invention.

DESCRIPTION OF THE PREFERRED EMBODIMENTS

The present invention discloses an LED lamp panel capable of adjusting color temperature 202 and uses several embodiments for the illustration of the invention. Preferably, the LED lamp panel capable of adjusting color temperature 202 is mainly provided for lamp manufacturers to adjust the color temperature of the manufactured LED light panel and then to sell the lamp panels to consumers. Therefore, the lighting manufacturers can adjust the color temperature according to the consumer requirements without the need of purchasing or manufacturing new LED light panels.

To make it easier for our examiner to understand the objective, technical characteristics, structure, innovative features, and performance of the invention, we use first to fourth preferred embodiments together with related drawings for the detailed description of the invention. It is noteworthy that the embodiments are provided for the purpose of illustrating the invention but not intended for limiting the scope of the invention.

First Embodiment

Figure 1:
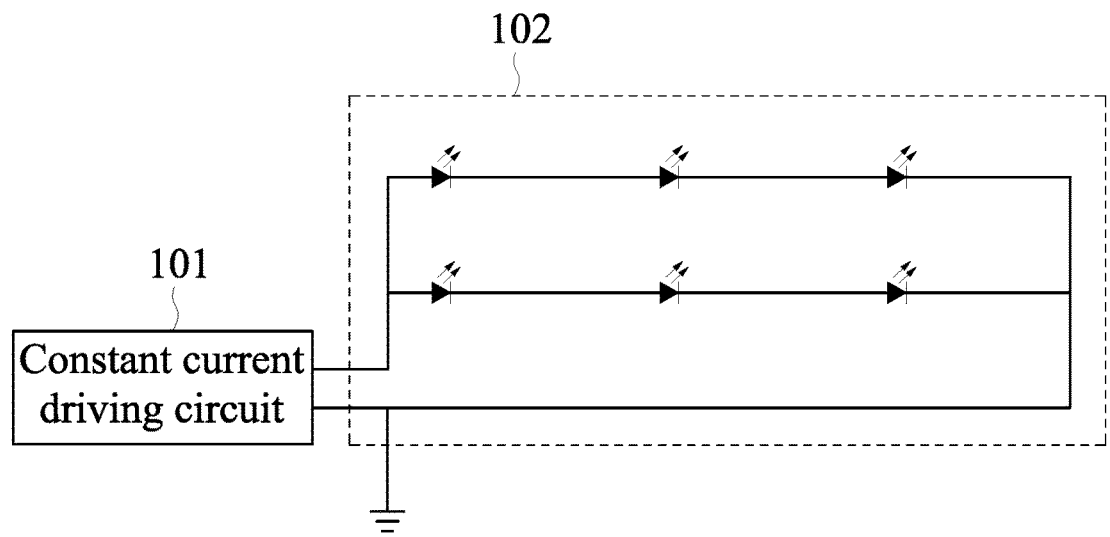
FIG. 1 is a schematic circuit diagram of a convention LED.
Figure 2:
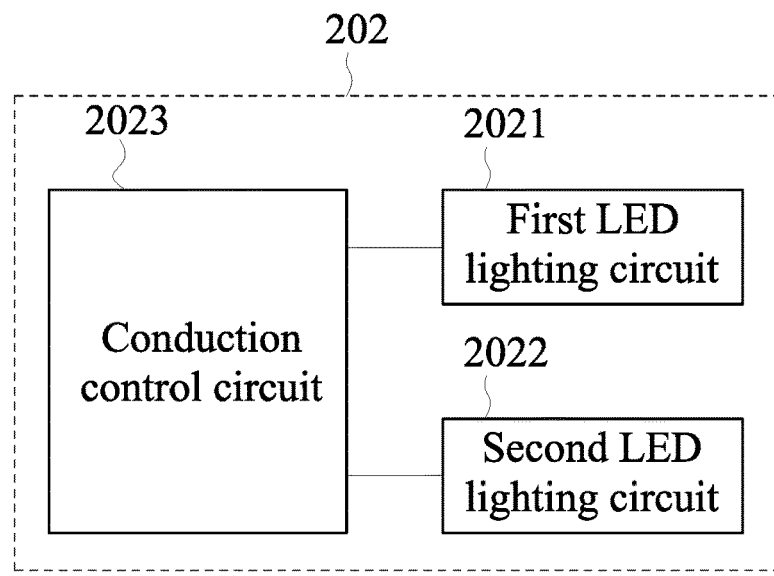
FIG. 2 is a schematic circuit diagram of an LED lamp panel capable of adjusting color temperature in accordance with first to fourth preferred embodiments of the present invention.

With reference to FIG. 2 for an LED lamp panel capable of adjusting color temperature 202 in accordance with the first embodiment of the present invention, the LED lamp panel capable of adjusting color temperature 202 comprises a first LED lighting circuit 2021, a second LED lighting circuit 2022 and a conduction control circuit 2023. The first LED lighting circuit 2021 has first color temperature information, and the second LED lighting circuit 2022 has second color temperature information. The conduction control circuit 2023 is electrically coupled to the first LED lighting circuit 2021 and the second LED lighting circuit 2022. Wherein, the first color temperature information and the second color temperature information are combined into color temperature parameter information, and the color temperature parameter information includes the color temperature table of each LED of the first LED lighting circuit 2021 and the second lighting circuit 2022 and their installation positions. Further, the conduction control circuit 2023 has color temperature information stored therein, and the color temperature information includes the color temperature parameter information and color temperature target information set by users, so that the LED lamp panel capable of adjusting color temperature 202 can emit a target color light. Wherein, the conduction control circuit 2023 can compute and generate a matching data table according to the preset color temperature information, and can compute and generate a control instruction according to the color temperature target information and the matching data table. The control instruction further includes a conduction time ratio, which is a ratio of the sequential conduction times of the first LED lighting circuit 2021 to the second LED lighting circuit 2022. Therefore, the conduction control circuit 2023 generates and transmits the control instruction to the first LED lighting circuit 2021 and the second LED lighting circuit 2022. The first LED lighting circuit 2021 and the second LED lighting circuit 2022 emit lights according to the conduction time ratio of the control instruction and achieve the color temperature adjusting operation of the LED lamp panel capable of adjusting color temperature 202.

Figure 3:
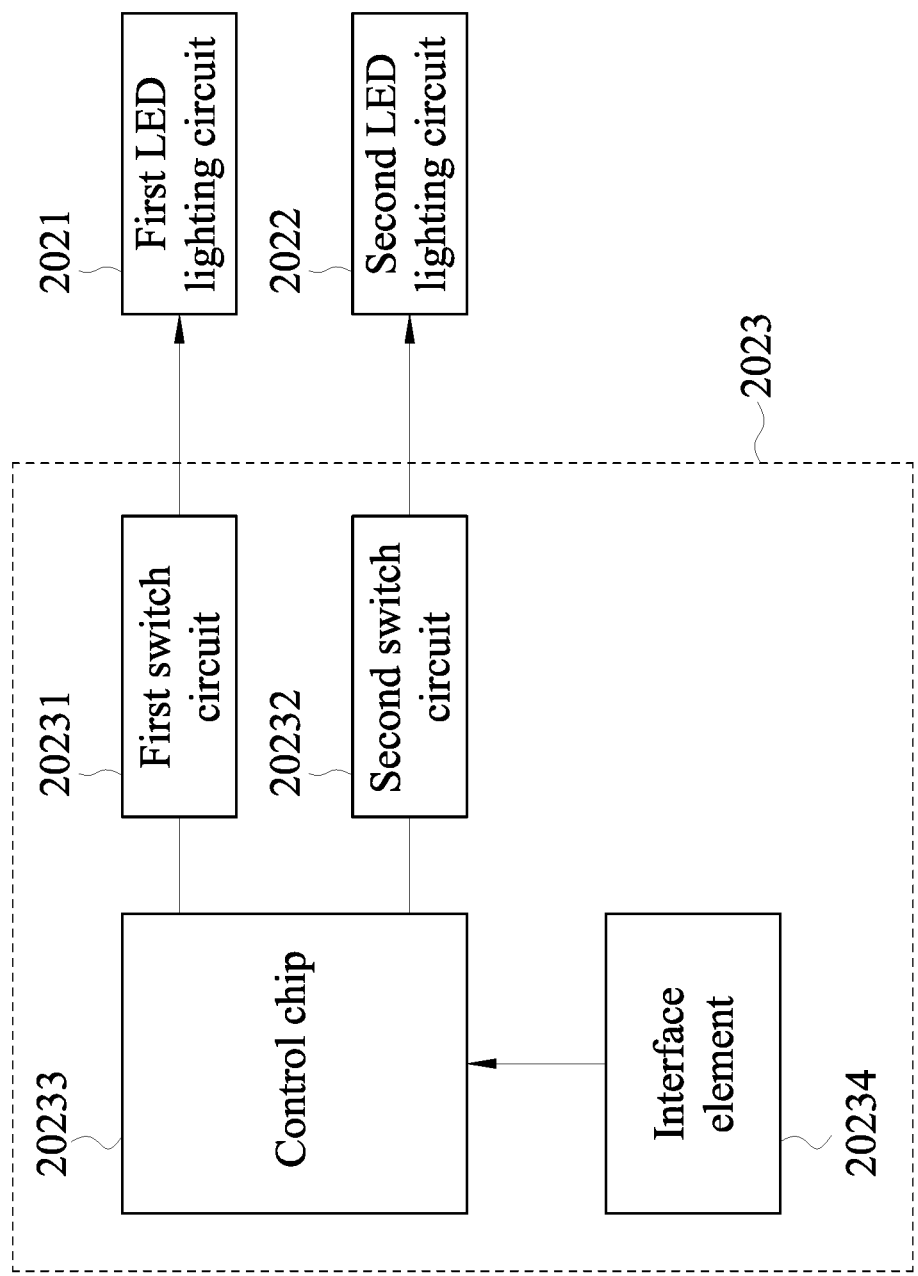
FIG. 3 is a schematic circuit diagram of a conduction control circuit in accordance with the first to fourth preferred embodiments of the present invention.

In FIG. 3, the conduction control circuit 2023 comprises a circuit board (not shown in the figure), a first switch circuit 20231, a second switch circuit 20232, a control chip 20233 and an interface element 20234. In addition, the first switch circuit 20231, the second switch circuit 20232, the control chip 20233 and the interface element 20234 are installed on the circuit board. The first switch circuit 20231 has an end electrically coupled to the first LED lighting circuit 2021 and the other end electrically coupled to the control chip 20233. The second switch circuit 20232 has an end electrically coupled to the second LED lighting circuit 2022 and the other end electrically coupled to the control chip 20233, and the interface element 20234 is communicatively coupled to the control chip 20233.

The control chip 20233 is a microcontroller unit (MCU), a central processing unit (CPU), or a baseband processor (BP). In this embodiment, the color temperature information has a smaller data volume, so that the inventor of the present invention selects the microcontroller unit as the control chip 20233 to compute the color temperature information and generate the control instruction which is received and executed by the first LED lighting circuit 2021 and the second LED lighting circuit 2022. Therefore, the use of the microcontroller unit has the advantages of low cost, light weight, and small volume, so as to lower the production cost of the LED lamp panel capable of adjusting color temperature 202.

In addition, the interface element 20233 further comprises a storage unit (not shown in the figure), and the storage unit may be a radio frequency identification (RFID Tag). Therefore, users can write the color temperature information into the storage unit through a RFID writer (RFID Writer), and the storage unit has the color temperature information stored therein. If a user wants to change the working color temperature of the LED lamp panel capable of adjusting color temperature 202, or it is necessary to change the color temperature target information, the user will simply need to write the updated color temperature information into the storage unit by the RFID writer. Therefore, the control chip 20233 can read and compute the color temperature information stored in the storage unit and generate the control instruction, so as to control the light emission conditions of the first LED lighting circuit 2021 and the second LED lighting circuit 2022 and achieve the color temperature adjusting operation of the LED lamp panel capable of adjusting color temperature 202.

Figure 4:
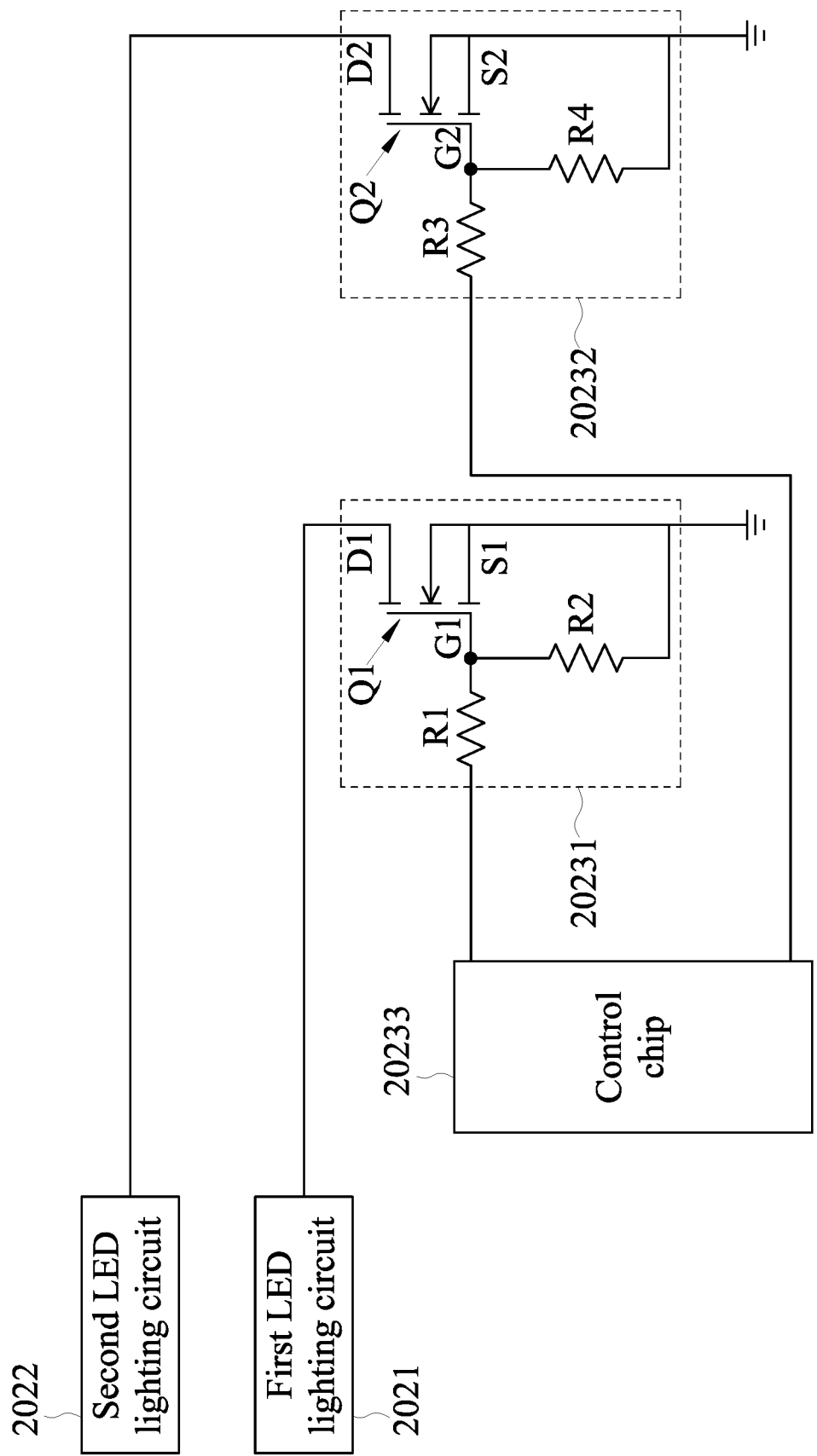
FIG. 4 is a schematic circuit diagram of a first switch circuit and a second switch circuit in accordance with the first to fourth preferred embodiments of the present invention.
Figure 5:
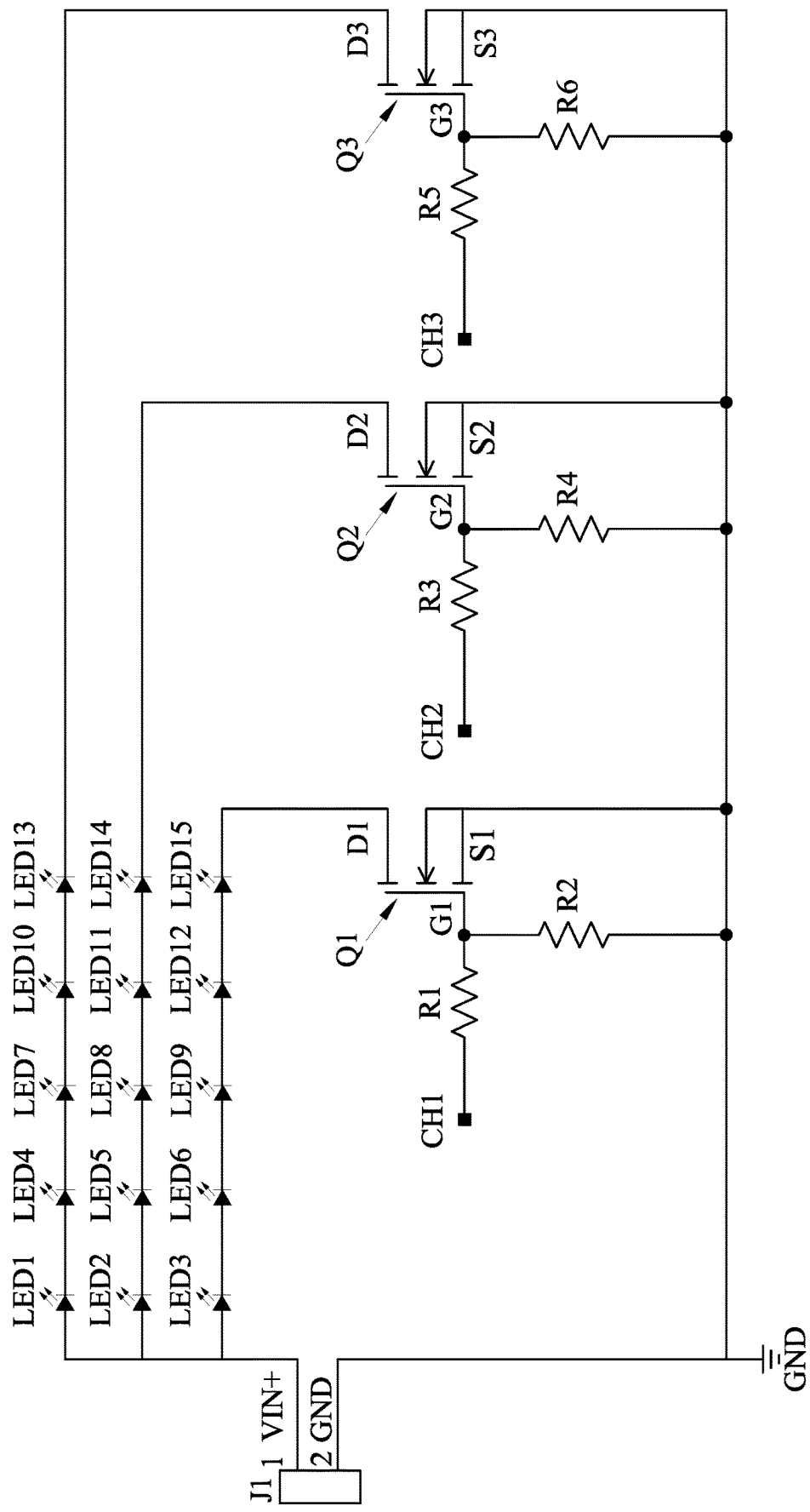
FIG. 5 is a schematic view of the circuit structure of an LED lamp panel capable of adjusting color temperature in accordance with the first to fourth preferred embodiments of the present invention.

In FIGS. 4 and 5, the first switch circuit 20231 further comprises a first MOSFET (Q1), a first resistor (R1) and a second resistor (R2). The first resistor (R1) has an end electrically coupled to the control chip 20233 and the other end communicatively coupled to a gate (G1) or the first MOSFET (Q1). The second resistor (R2) has an end electrically coupled to the gate (G1) of the first MOSFET (Q1) and the other end grounded. The first MOSFET (Q1) has a drain (D1) electrically coupled to the first LED lighting circuit 2021 and a source (51) grounded.

In addition, the second switch circuit 20232 further comprises a second MOSFET (Q2), a third resistor (R3) and a fourth resistor (R4). The third resistor (R3) has an end electrically coupled to the control chip 20233 and the other end communicatively coupled to a gate (G2) of the second MOSFET (Q2). The fourth resistor (R4) has an end electrically coupled to the gate (G2) of the second MOSFET (Q2) and the other end grounded. The second MOSFET (Q2) has a drain (D2) electrically coupled to the second LED lighting circuit 2022 and a source (S2) grounded.

In FIG. 5, the first LED lighting circuit 2021 further comprises a plurality of first LEDs. Preferably, there are five first LED lighting circuits 2021 electrically coupled to one another serially and marked as LED1, LED4, LED7, LED10, and LED13 respectively in the figure.

Similarly, the second LED lighting circuit 2022 further comprises a plurality of second LEDs. In this embodiment, there are five second LED lighting circuits electrically coupled to one another serially and marked as LED2, LED5, LED8, LED11, and LED14 respectively in the figure.

In addition, the LED lamp panel capable of adjusting color temperature 202 further comprises a first plug (J1), and the first plug (J1) has a first conductive terminal and a second conductive terminal. In the figure, the first conductive terminal is electrically coupled to the first LED lighting circuit 2021 and the second LED lighting circuit 2022, and the second conductive terminal is grounded. Preferably, the first plug (J1) is electrically coupled to a constant current driving circuit (not shown in the figure) and a second plug (not shown in the figure), and both of the second plug and the first plug are impedance matching, so that the LED lamp panel capable of adjusting color temperature can be applied to a circuit system with a fixed current.

The LED lamp panel capable of adjusting color temperature 202 further comprises a third LED lighting circuit, and the third LED lighting circuit has third color temperature information and is communicatively coupled to the conduction control circuit. In addition, the conduction control circuit 2023 further comprises a third switch circuit installed on the circuit board. In FIG. 5, the third switch circuit further comprises a third MOSFET (Q3), a fifth resistor (R5) and a sixth resistor (R6). The fifth resistor (R5) has an end electrically coupled to the control chip 20233 and the other end electrically coupled to a gate (G3) of the third MOSFET (Q3). The sixth resistor (R6) has an end electrically coupled to the gate (G3) of the third MOSFET (Q3) and the other end grounded. The third MOSFET (Q3) has a drain (D3) electrically coupled to the third LED lighting circuit and a source (S3) grounded.

The third LED lighting circuit further comprises a plurality of third LEDs. Preferably, there are five third LEDs coupled to each other serially and marked as LED3, LED6, LED9, LED12, and LED15 respectively in the figure.

In this embodiment, the LED lamp panel capable of adjusting color temperature 202 further comprises a plurality of other LED lighting circuits, and the conduction control circuit 2023 further comprises the corresponding switch circuit. Similarly, the control chip 20233 and/or the interface element 20234 have the color temperature information of each LED installed in the switch circuit, and such information is provided for the control chip 20233 computes and generates the control instruction, so that the LED lamp panel capable of adjusting color temperature 202 can execute the target color temperature value. For example, the LED lamp panel capable of adjusting color temperature 202 further comprises a fourth LED lighting circuit and a fifth LED lighting circuit.

Second Embodiment

The difference between this embodiment and the aforementioned embodiment resides on that the interface element 20234 has a reading unit (not shown in the figure) in addition to the storage unit, and the reading unit is electrically coupled to the storage unit. Preferably, the interface unit is a RFID writer provided for writing the color temperature information into the storage unit via a RFID transmission. Therefore, the reading unit can read the color temperature information from the storage unit and then can actively transmit the color temperature information to the control chip 20233 in order to carry out the subsequent operation of the control chip 20233.

Third Embodiment

The difference between this embodiment and the aforementioned embodiments resides on that the interface element 20234 is a DIP switch. Users can set up the switch plug of the DIP switch, and the switch plug is configured to be corresponsive to each LED of the first LED lighting circuit 2021 and the second LED lighting circuit 2022, so that the interface unit 20234 has color coordination information. In addition, the control chip 20233 has color temperature ratio information stored therein and corresponding to the color temperature value of the LED in the circuit. Preferably, the color coordination information and the color temperature ratio information are combined into color temperature information, and the color temperature information is associated with the first color temperature information and the second color temperature information. In this embodiment, the color temperature information also includes the color temperature parameter information and the color temperature target information. Wherein, the color temperature parameter information refers to the color temperature ratio information, the first color temperature information and the second color temperature information, and the color temperature target information is the color coordination information provided for users to change the target color temperature at a working status.

If a user wants to change the working color temperature of the LED lamp panel capable of adjusting color temperature 202, the user will be able to reset the switch plug of the DIP switch according to a decoding table of the DIP switch to change the color coordination information. The control chip 20233 computes the color temperature ratio information and the color coordination information and generates the control instruction. Therefore, each LED lighting circuit of the LED lamp panel capable of adjusting color temperature 202 comprises the first LED lighting circuit 2021, the second LED lighting circuit 2022 and the third LED lighting circuit and is capable of emitting light according to a conduction time ratio contained in the control instruction, so as to achieve the color temperature adjusting operation of the LED lamp panel capable of adjusting color temperature 202.

Fourth Embodiment

Figure 7:
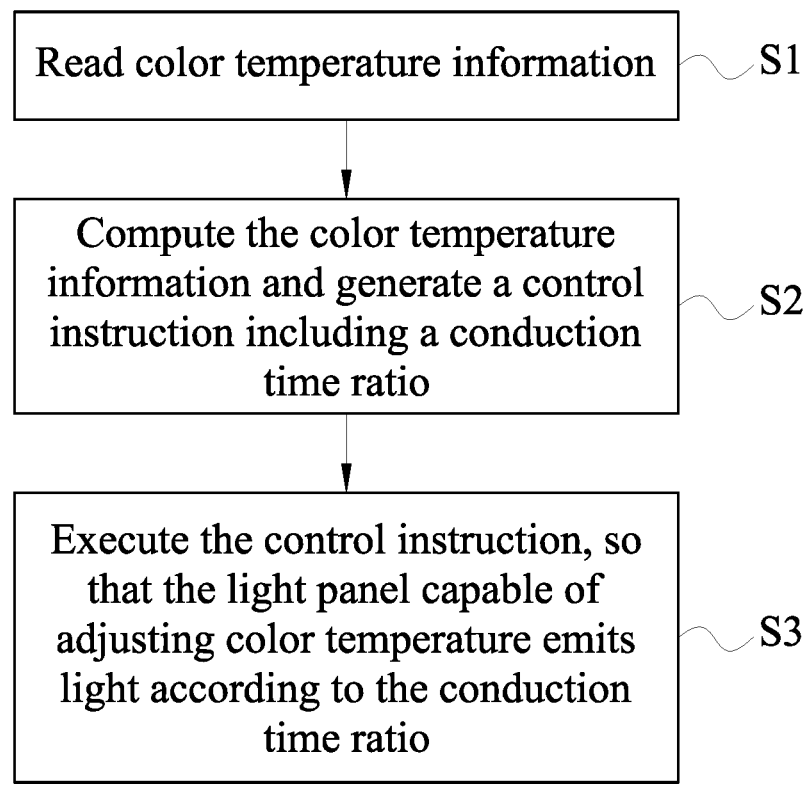
FIG. 7 is a flow chart showing the operation of an LED light panel in accordance with the fourth embodiment of the present invention.
Figure 8:
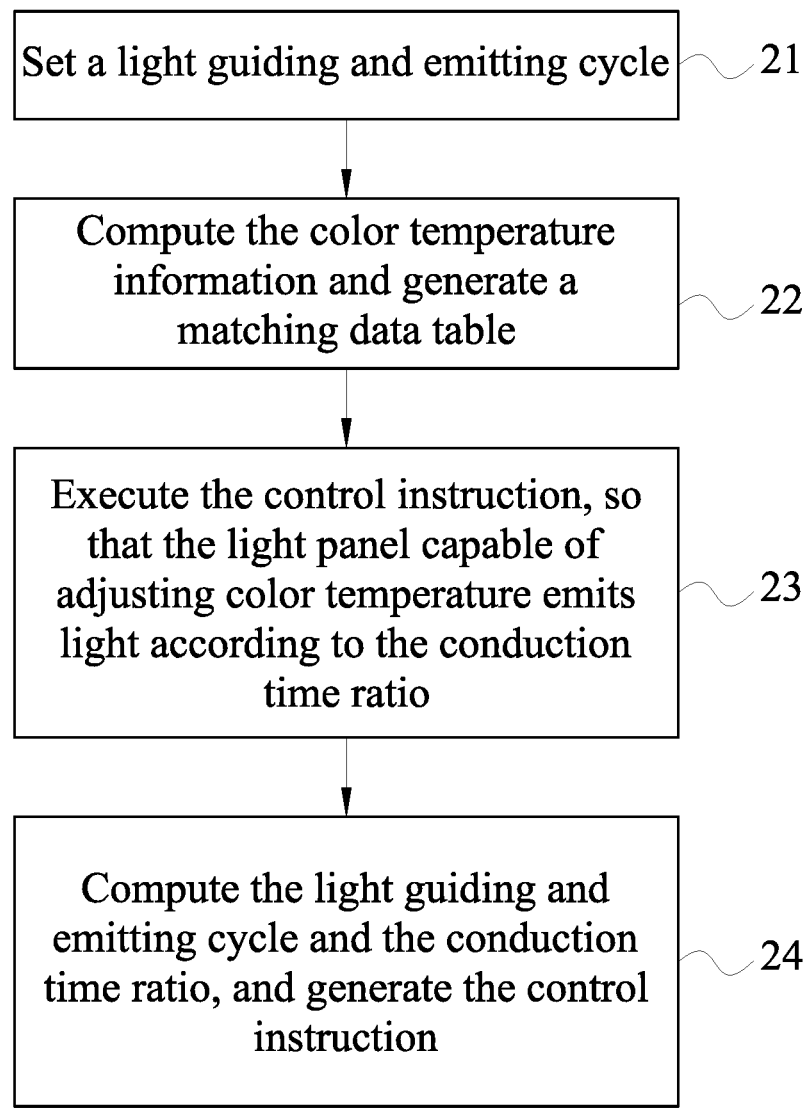
FIG. 8 is a flow chart of Step (3) of the fourth embodiment of the present invention embodiment.

With reference to FIGS. 7 and 8 for the detailed description of the operation of adjusting the color temperature of the LED lamp panel capable of adjusting color temperature, the color temperature adjusting operation comprises the steps (1) to (4), and the step (3) further comprises the steps (31) to (34).

Step (1): Provide the LED lamp panel capable of adjusting color temperature 202, wherein the LED lamp panel capable of adjusting color temperature 202 has color temperature information, just like the LED lamp panel capable of adjusting color temperature 202 of any one of the aforementioned first to third embodiments.

Step (2): Read the color temperature information (51), wherein the color temperature information includes the color temperature parameter information and the color temperature target information and is configured according to the different interface elements 20234 which has been described in the aforementioned embodiments. When the interface element 20234 is a RFID writer, the color temperature information is the first color temperature information, the second color temperature information, and the color temperature target information which is set by users. When the interface element 20234 is a DIP switch, the color temperature information includes the color coordination information which is set by users and the color temperature ratio information.

Step (3): The control chip 20233 computes the color temperature information and generates a control instruction, and the control instruction includes a conduction time ratio (S2).

Step (31): A user sets a light guiding and emitting cycle (T) (21) through a RFID writer or a switch plug of the DIP switch.

Step (32): The control chip 20233 computes the color temperature parameter information and generates a matching data table (22). The matching data table lists the color temperature value of each LED of the LED lamp panel capable of adjusting color temperature 202 and the corresponding conduction time. Therefore, the matching data table is a data table recording different color temperature values of each LED corresponding to different conduction time and using the color temperature values for the color temperature and conduction time.

Step (33): The control chip 20233 looks up the conduction time of each LED from the matching data table according to the color temperature target information. The control chip 20233 computes the color temperature target information and the matching data table and generates the conduction time ratio (23).

Step (34): The control chip 20233 computes the light guiding and emitting cycle and the conduction time ratio and generates the control instruction (24), so that each LED lighting circuit of the LED lamp panel capable of adjusting color temperature 202 emits light sequentially.

Step (4): The LED lamp panel capable of adjusting color temperature 202 executes the control instruction, so that the LED lamp panel capable of adjusting color temperature 202 emits light according to the conduction time ratio (S3) to achieve the target color temperature.

Figure 6:
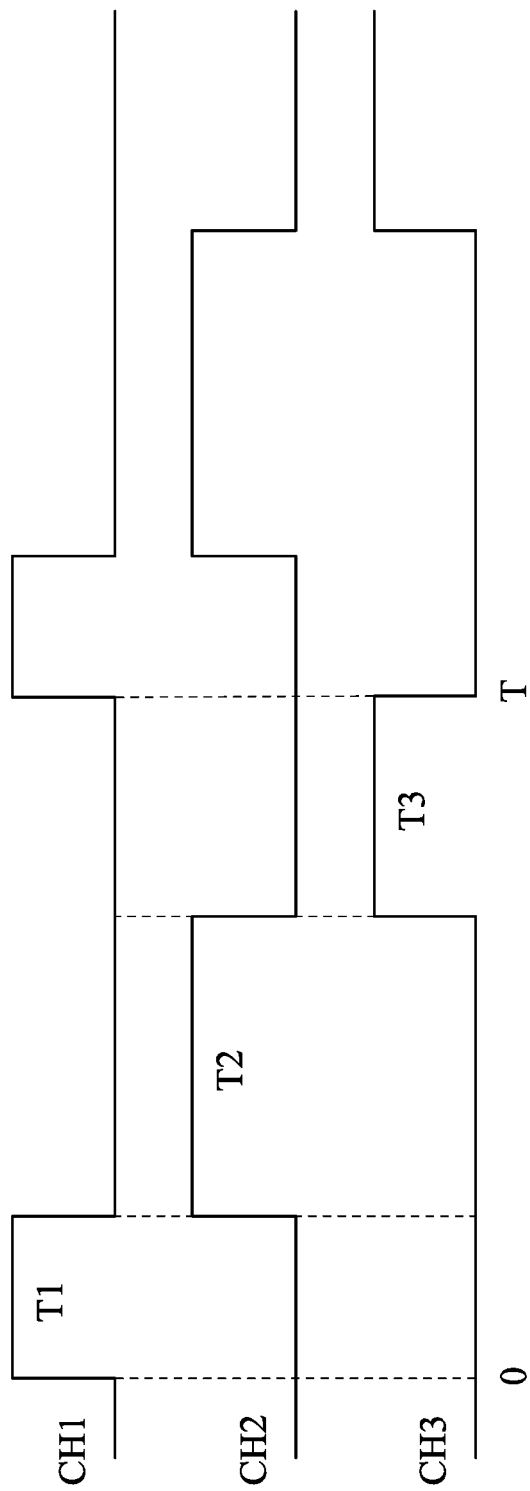
FIG. 6 is a timing chart of signals of a control instruction in accordance with a fourth embodiment of the present invention.

With reference to FIGS. 5 and 6 for s specific description of the operation procedure of the LED lamp panel capable of adjusting color temperature 202 in accordance with an embodiment of the present invention, there are three LED lighting circuits in this embodiment, and three switch signals are provided for controlling three MOSFETs (Q1, Q2 and Q3) respectively. In a light guiding and emitting cycle (such as 1000 μs), three MOSFETs (Q1, Q2 and Q3) are conducted sequentially. T1, T2 and T3 represent the conduction time of the three MOSFETs (Q1, Q2 and Q3), and T1+T2+T3=1000 us. Since not all or a part of the LEDs in the LED lamp panel capable of adjusting color temperature 202 are conducted, they are conducted sequentially. Therefore, the current outputted from each LED in every conduction time is a constant driving current. The proportion of T1/T2/T3 is determined by the information of each LED and the color temperature which is the color temperature parameter information. When T1, T2 and T3 are equal to 300 μs, 500 μs and 200 μs respectively which are the specific conduction time of the first MOSFET (Q1), the second MOSFET (Q2) and the third MOSFET (Q3), these are default values obtained by computing the color temperature parameter information of the corresponding LED, and the default values are stored into an EEPROM of a RFID tag of the interface element 20234 or the control chip 20233 as shown in FIG. 9.

The presently used three LEDs are of the colors RGB. If a user wants to change the working color to red, the user may set T1 to 1000 μs and T2 and T3 to 0 μs. If the user wants to set the working color temperature to a white light of 6500K, the control chip 20233 can compute the specific conduction time or ratio of T1, T2 and T3 according to the matching data table. Therefore, the color temperature and its corresponding conduction time ratio of the MOSFETs (Q1, Q2 and Q3) are written into the interface element 20234 or the control chip 20233 in advance. During installation, the users just need to select the target color temperature.

Similarly, the LED lamp panel capable of adjusting color temperature 202 may use 2, 4, 5 or 6 strings of MOSFETs according to specific requirements such as the color temperature, hue, or color rendering, etc. The number of strings of MOSFETs corresponds to the quantity of LED lighting circuits. If a MOSFET is coupled to two strings of LED lighting circuit, such MOSFET will still be considered as a series of MOSFET.

In summation of the description above, the LED lamp panel capable of adjusting color temperature 202 in accordance with the present invention allows lamp manufacturers to adjust the working color temperature of the lamp panel by themselves, so as to avoid the pressure of inventory. The control chip 20233 computes the color temperature information in the interface element 20234 and generates their corresponding conduction time and the control instruction, so that the LEDs installed to the LED lamp panel capable of adjusting color temperature 202 emit lights sequentially according to the control instruction and display the lights according to the target color temperature.

What is claimed is:
1. An LED lamp panel capable of adjusting color temperature, comprising:

a first LED lighting circuit, having first color temperature information;
a second LED lighting circuit, having second color temperature information; and
a conduction control circuit, electrically coupled to the first LED lighting circuit and the second LED lighting circuit;
wherein, when the conduction control circuit obtains color temperature target information and a light guiding and emitting cycle, the conduction control circuit reads the first color temperature information and the second color temperature information to generate a matching data table, and compute a conduction time ratio of the first LED lighting circuit to the second LED lighting circuit according to the color temperature target information and the matching data table, and the conduction control circuit transmits an execution instruction containing the conduction time ratio and the light guiding and emitting cycle to the first LED lighting circuit and the second LED lighting circuit to drive the first LED lighting circuit and the second LED lighting circuit to emit lights according to the conduction time ratio,
wherein the conduction control circuit comprises a circuit board, a first switch circuit, a second switch circuit, a control chip and an interface element, and the first switch circuit, the second switch circuit, the control chip and the interface element are installed onto the circuit board; the first switch circuit has an end electrically coupled to the first LED lighting circuit and an another end electrically coupled to the control chip, and the second switch circuit has an end electrically coupled to the second LED lighting circuit and an another end electrically coupled to the control chip, and the interface element is communicatively coupled to the control chip,
wherein the interface element further comprises a storage unit, and the storage unit has color temperature information stored therein, and the color temperature information is associated with the first color temperature information and the second color temperature information,
wherein the storage unit is a radio frequency identification (RFID) tag.

2. The LED lamp panel capable of adjusting color temperature according to claim 1, wherein the control chip is a microcontroller unit (MCU).

3. The LED lamp panel capable of adjusting color temperature according to claim 1, wherein the first switch circuit further comprises a first MOSFET, a first resistor and a second resistor; the first resistor has an end electrically coupled to the control chip and an another end communicatively coupled to a gate of the first MOSFET; the second resistor has an end electrically coupled to the gate of the first MOSFET and an another end grounded; the first MOSFET has a drain electrically coupled to the first LED lighting circuit and a source grounded.

4. The LED lamp panel capable of adjusting color temperature according to claim 3, wherein the second switch circuit further comprises a second MOSFET, a third resistor and a fourth resistor; the third resistor has an end electrically coupled to the control chip and an another end communicatively coupled to a gate of the second MOSFET; the fourth resistor has an end electrically coupled to the gate of the second MOSFET and an another end grounded; the second MOSFET has a drain electrically coupled to the second LED lighting circuit and source grounded.

5. The LED lamp panel capable of adjusting color temperature according to claim 4, further comprising a third LED lighting circuit having third color temperature information and communicatively coupled to the conduction control circuit, and the conduction control circuit further comprising a third switch circuit installed on the circuit board; the third switch circuit further comprising a third MOSFET, a fifth resistor and a sixth resistor; the fifth resistor having an end electrically coupled to the control chip and an another end electrically coupled to a gate of the third MOSFET; the sixth resistor having an end electrically coupled to the gate of the third MOSFET and an another end grounded; the third MOSFET has a drain electrically coupled to the third LED lighting circuit and a source grounded.

6. The LED lamp panel capable of adjusting color temperature according to claim 5, wherein the third LED lighting circuit further comprises a plurality of third LEDs sequentially and electrically coupled to one another into a series.

7. The LED lamp panel capable of adjusting color temperature according to claim 1, wherein the first LED lighting circuit further comprises a plurality of first LEDs sequentially and electrically coupled to one another into a series.

8. The LED lamp panel capable of adjusting color temperature according to claim 1, wherein the second LED lighting circuit further comprises a plurality of second LEDs sequentially and electrically coupled to one another into a series.

9. The LED lamp panel capable of adjusting color temperature according to claim 1, further comprising a first plug, and the first plug having a first conductive terminal and a second conductive terminal; wherein the first conductive terminal is electrically coupled to the first LED lighting circuit and the second LED lighting circuit, and the second conductive terminal is grounded.

10. An LED lamp panel capable of adjusting color temperature, comprising:
- a first LED lighting circuit, having first color temperature information;
- a second LED lighting circuit, having second color temperature information; and
- a conduction control circuit, electrically coupled to the first LED lighting circuit and the second LED lighting circuit;
- wherein, when the conduction control circuit obtains color temperature target information and a light guiding and emitting cycle, the conduction control circuit reads the first color temperature information and the second color temperature information to generate a matching data table, and compute a conduction time ratio of the first LED lighting circuit to the second LED lighting circuit according to the color temperature target information and the matching data table, and the conduction control circuit transmits an execution instruction containing the conduction time ratio and the light guiding and emitting cycle to the first LED lighting circuit and the second LED lighting circuit to drive the first LED lighting circuit and the second LED lighting circuit to emit lights according to the conduction time ratio,
- wherein the conduction control circuit comprises a circuit board, a first switch circuit, a second switch circuit, a control chip and an interface element, and the first switch circuit, the second switch circuit, the control chip and the interface element are installed onto the circuit board; the first switch circuit has an end electrically coupled to the first LED lighting circuit and an another end electrically coupled to the control chip, and the second switch circuit has an end electrically coupled to the second LED lighting circuit and an another end electrically coupled to the control chip, and the interface element is communicatively coupled to the control chip,
- wherein the interface element further comprises a storage unit, and the storage unit has color temperature information stored therein, and the color temperature information is associated with the first color temperature information and the second color temperature information,
- wherein the interface element further comprises a reading unit communicatively coupled to the storage unit.

11. The LED lamp panel capable of adjusting color temperature according to claim 10, wherein the interface unit is a RFID reader/writer.

12. The LED lamp panel capable of adjusting color temperature according to claim 10, wherein the first switch circuit further comprises a first MOSFET, a first resistor and a second resistor; the first resistor has an end electrically coupled to the control chip and an another end communicatively coupled to a gate of the first MOSFET; the second resistor has an end electrically coupled to the gate of the first MOSFET and an another end grounded; the first MOSFET has a drain electrically coupled to the first LED lighting circuit and a source grounded.

13. The LED lamp panel capable of adjusting color temperature according to claim 12, wherein the second switch circuit further comprises a second MOSFET, a third resistor and a fourth resistor; the third resistor has an end electrically coupled to the control chip and an another end communicatively coupled to a gate of the second MOSFET; the fourth resistor has an end electrically coupled to the gate of the second MOSFET and an another end grounded; the second MOSFET has a drain electrically coupled to the second LED lighting circuit and source grounded.

14. The LED lamp panel capable of adjusting color temperature according to claim 13, further comprising a third LED lighting circuit having third color temperature information and communicatively coupled to the conduction control circuit, and the conduction control circuit further comprising a third switch circuit installed on the circuit board; the third switch circuit further comprising a third MOSFET, a fifth resistor and a sixth resistor; the fifth resistor having an end electrically coupled to the control chip and an another end electrically coupled to a gate of the third MOSFET; the sixth resistor having an end electrically coupled to the gate of the third MOSFET and an another end grounded; the third MOSFET has a drain electrically coupled to the third LED lighting circuit and a source grounded.

15. The LED lamp panel capable of adjusting color temperature according to claim 14, wherein the third LED lighting circuit further comprises a plurality of third LEDs sequentially and electrically coupled to one another into a series.

16. An LED lamp panel capable of adjusting color temperature, comprising:
- a first LED lighting circuit, having first color temperature information;
- a second LED lighting circuit, having second color temperature information; and
- a conduction control circuit, electrically coupled to the first LED lighting circuit and the second LED lighting circuit;

wherein, when the conduction control circuit obtains color temperature target information and a light guiding and emitting cycle, the conduction control circuit reads the first color temperature information and the second color temperature information to generate a matching data table, and compute a conduction time ratio of the first LED lighting circuit to the second LED lighting circuit according to the color temperature target information and the matching data table, and the conduction control circuit transmits an execution instruction containing the conduction time ratio and the light guiding and emitting cycle to the first LED lighting circuit and the second LED lighting circuit to drive the first LED lighting circuit and the second LED lighting circuit to emit lights according to the conduction time ratio, wherein the conduction control circuit comprises a circuit board, a first switch circuit, a second switch circuit, a control chip and an interface element, and the first switch circuit, the second switch circuit, the control chip and the interface element are installed onto the circuit board; the first switch circuit has an end electrically coupled to the first LED lighting circuit and an another end electrically coupled to the control chip, and the second switch circuit has an end electrically coupled to the second LED lighting circuit and an another end electrically coupled to the control chip, and the interface element is communicatively coupled to the control chip, wherein the interface unit is a DIP switch, and the interface unit has color coordination information, and the control chip has color temperature ratio information stored therein; the color temperature ratio information and the color coordination information are combined into color temperature information, and the color temperature information is associated with the first color temperature information and the second color temperature information.

17. The LED lamp panel capable of adjusting color temperature according to claim 16, wherein the first switch circuit further comprises a first MOSFET, a first resistor and a second resistor; the first resistor has an end electrically coupled to the control chip and an another end communicatively coupled to a gate of the first MOSFET; the second resistor has an end electrically coupled to the gate of the first MOSFET and an another end grounded; the first MOSFET has a drain electrically coupled to the first LED lighting circuit and a source grounded.

18. The LED lamp panel capable of adjusting color temperature according to claim 17, wherein the second switch circuit further comprises a second MOSFET, a third resistor and a fourth resistor; the third resistor has an end electrically coupled to the control chip and an another end communicatively coupled to a gate of the second MOSFET; the fourth resistor has an end electrically coupled to the gate of the second MOSFET and an another end grounded; the second MOSFET has a drain electrically coupled to the second LED lighting circuit and source grounded.

19. The LED lamp panel capable of adjusting color temperature according to claim 18, further comprising a third LED lighting circuit having third color temperature information and communicatively coupled to the conduction control circuit, and the conduction control circuit further comprising a third switch circuit installed on the circuit board; the third switch circuit further comprising a third MOSFET, a fifth resistor and a sixth resistor; the fifth resistor having an end electrically coupled to the control chip and an another end electrically coupled to a gate of the third MOSFET; the sixth resistor having an end electrically coupled to the gate of the third MOSFET and an another end grounded; the third MOSFET has a drain electrically coupled to the third LED lighting circuit and a source grounded.

20. The LED lamp panel capable of adjusting color temperature according to claim 19, wherein the third LED lighting circuit further comprises a plurality of third LEDs sequentially and electrically coupled to one another into a series.

* * * * *